G. W. LINDSEY.
Animal-Trap.
No. 225,708.   Patented Mar. 23, 1880.
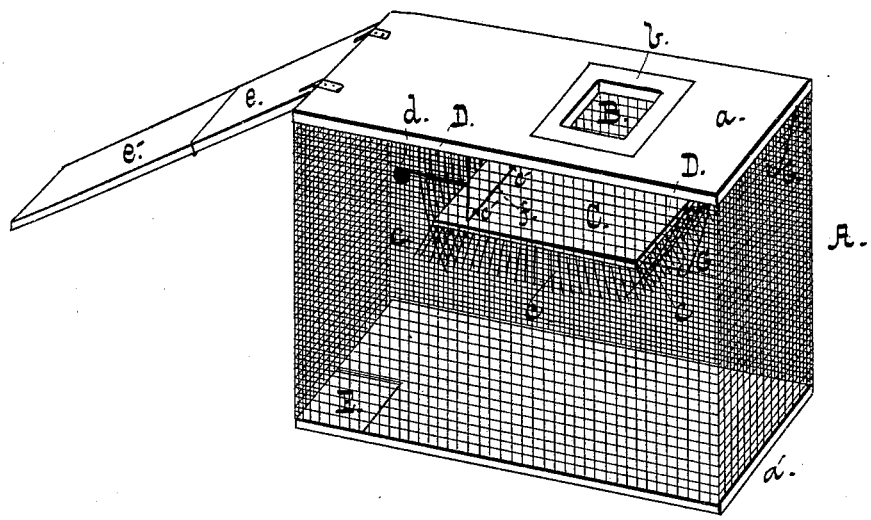
Witnesses,
W. A. Bertram
Dr L. H. Barclay
Inventor,
G. W. Lindsey.
by A. B. Williams
Attorney.

UNITED STATES PATENT OFFICE.

GEORGE W. LINDSEY, OF BALTIMORE, MARYLAND.

ANIMAL-TRAP.

SPECIFICATION forming part of Letters Patent No. 225,708, dated March 23, 1880.

Application filed January 21, 1880.

*To all whom it may concern:*

Be it known that I, GEO. W. LINDSEY, of Baltimore city, State of Maryland, have invented certain new and useful Improvements in Animal-Traps; and I hereby declare the same to be fully, clearly, and exactly described as follows, reference being had to the accompanying drawing, in which the device is illustrated in perspective.

The object of my invention is to furnish a trap for catching rats, mice, minks, or other animals, so constructed as to lure them into a position of apparent safety, whence they are suddenly precipitated into the trap and the entrance closes behind them; and, furthermore, to prevent the possibility of the entrapped animals opening the entrance or feeding upon the bait.

To these ends I construct the trap as follows:

A is the cage, of coarse wire-gauze, having a solid top and bottom, $a$ $a'$. In the latter is a hole, B, bound with smooth sheet metal, $b$.

C is a platform, pivoted at $c'$ $c'$ upon a bail, $f$, and having a counterpoise, $d$. This platform is placed sufficiently far beneath the hole B to prevent the rat or other animal from reaching it with his fore paws, and perceiving that it yields to his weight while standing at the edge of the hole, or, at least, so far that when he does reach it with his fore paws he cannot retreat by reason of the smooth facing $b$ furnishing no foot-hold.

Opposite the ends of the platform wires D D, curved as shown, and having pointed ends, interlace with similar wires, $c$ $c$, secured to the platform. The wires $c$ are arranged completely around the platform C, so as to prevent the imprisoned animal from tilting the platform.

G G are bait-hooks, affixed high up at one end of the trap, but so as to render the bait visible through the hole B. A board, $e$, is hinged to the top of the trap at one edge, and a second board, $e'$, is hinged to the first, as shown, whereby an inclined plane is formed, affording ready access to the top of the trap.

E is a slide covering an opening through which the animal is removed from the trap.

In operation, the hooks G being baited, and, by preference, bait being trailed up the boards $e$ $e'$, the trap is set in a place frequented by the animals. The latter, perceiving and scenting the bait through the gauze, endeavor to reach it, but find that the trap has only one opening, at B, through which they leap upon the platform C. This latter immediately yields and precipitates them into the body of the trap.

Instead of causing the trap to yield instantly, I may support it by a little hook attached to the bait-support, which hook is released as the animal tugs at the bait.

Should it be desired to use live bait, as a fowl, a portion of the body of the trap is partitioned off.

When not in use the boards $e$ $e'$ fold snugly upon the top of the trap.

I am aware that tilting platforms and converging wires to prevent the egress of the animal from the trap are old, and such I do not claim.

What I claim is—

1. The combination, with the platform C, swung upon the bail $f$, and having counterpoise $d$, of the wires C D and bait-hooks G.

2. In combination with the trap A, the inclined way consisting of the boards $e$ $e'$, hinged together and to the trap, whereby they may be folded upon the latter, as set forth.

GEO. W. LINDSEY.

Witnesses:
L. D. WILLIAMS,
JOHN C. GITTINGER.